United States Patent
Frick et al.

[15] 3,679,709

[45] July 25, 1972

[54] PREPARATION OF OCTAFLUOROTETRAHYDROFURAN

[72] Inventors: Hughie R. Frick; Richard W. Anderson, both of Midland, Mich.

[73] Assignee: The Dow Chemical Company, Midland, Mich.

[22] Filed: July 6, 1970

[21] Appl. No.: 52,757

[52] U.S. Cl. ................................................346.1 R
[51] Int. Cl. .................................................C07d 5/04
[58] Field of Search ...........................260/346.1 R

[56] References Cited

FOREIGN PATENTS OR APPLICATIONS 1,138,190  12/1968  Great Britain

*Primary Examiner*—Nicholas S. Rizzo
*Assistant Examiner*—Bernard Dentz
*Attorney*—Griswold & Burdick, Jerome L. Jeffers and William R. Norris

[57] ABSTRACT

Disclosed is a process for the preparation of octafluorotetrahydrofuran. The process involves reacting perfluoroglutaryl fluoride with fluorine in the presence of KF, CsF, AgF or RbF as catalyst. The reaction is carried out at a temperature within the range of from about −196° to 25°C.

6 Claims, No Drawings

PREPARATION OF OCTAFLUOROTETRAHYDROFURAN

The invention described herein was made in the course of or under a contract or subcontract thereunder with the Department of the Navy.

The present invention is a process for the preparation of octafluorotetrahydrofuran, a composition useful as an inert solvent for highly reactive or corrosive halogenated materials. The process is based on the discovery that perfluoroglutaryl fluoride will react with fluorine in the presence of KF, CsF, AgF or RbF to form the desired product. The reaction is carried out at a temperature of from about $-196°$ to $25°$ C.

The process is normally practiced by expanding the perfluoroglutaryl fluoride into the reaction vessel containing the catalyst and cooling the vessel to $-196°$ C with liquid nitrogen. Fluorine is then condensed into the vessel. Fluorine should be introduced after the perfluoroglutaryl fluoride since its vapor pressure of about 200 mm. Hg at $-196°$ C would result in some fluorine loss were it introduced first and the vessel reopened to introduce the perfluoroglutaryl fluoride. The reaction proceeds at temperatures as low as about $-196°$ C; however, as the temperature is decreased, a more active catalyst is required. The catalyst becomes more active as it is used in the instantly described reaction. Accordingly, reuse of the catalyst is desirable. The metal fluoride catalyst should be finely ground for maximum surface contact.

The maximum temperature at which the reactants should be contacted is about $25°$ C. At temperatures above about $25°$ C fragmentation becomes the predominant mode of reaction. Preferred reaction temperatures will depend on the activity of the catalyst. In general, a reaction temperature within the range of from $-150°$ to $-50°$ C is preferred. The reaction is strongly exothermic. A heat transferring material such as steel wool is normally intermixed with the catalyst to prevent fragmentation of the product due to overheating.

The ratio of reactants is not critical, i.e. the reaction will proceed with an excess of either reactant. Stoichiometric amounts of perfluoroglutaryl fluoride and fluorine are preferred since excess fluorine tends to increase product fragmentation.

Alternatively, a complex of the catalyst and perfluoroglutaryl fluoride is prepared and contacted with fluorine to form the desired product. The metal fluoride-perfluoroglutaryl fluoride complex is prepared by contacting these compounds in a sealed chamber at about $70°$ C. Preferably, the complex formation is carried out in a solvent such as B,B'-dimethoxydiethyl ether, 1,2-dimethoxyethane or N,N-dimethyl-formamide. The solvent is vacuum distilled from the complex leaving a dry reactant for subsequent reaction with fluorine. Preparation of the complex permits a flow type reaction since fluorine can be passed over and through the complexed material in a continuous manner.

While the invention is not predicated upon the theory behind its operation, the following equation is believed to illustrate the mechanism:

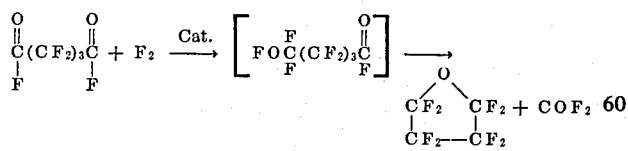

The presence of other products such as $C_2F_6, CF_3OF$ and $C_3F_8$ in the reaction vessel indicates that some fragmentation occurs.

The invention is further illustrated by the following examples.

EXAMPLE I

A 25 gm. sample of cesium fluoride which had been finely ground and treated once previously with perfluoroglutaryl fluoride was placed in a 1-liter stainless steel cylinder loosely packed with coarse stainless steel wool. A 3.22 millimole (1,143 ml. 0 52 mm. Hg) sample of perfluoroglutaryl fluoride was condensed into the reactor at $-196°$ C and 6.44 millimole (143 ml. 0 830 mm. Hg) of fluorine was allowed to expand into the reactor at this temperature. The reactor was closed and allowed to stand in a $-78°$ C bath for 2.5 hours, after which time only a few millimeters pressure remained.

Pumping on the system through a $-196°$ C trap and a soda-lime trap removed some $COF_2$ and $CF_3OF$. The remaining 1.1 gm. of material was vacuum transferred into a 30 ml. stainless steel cylinder. The material was warmed to room temperature and shortly thereafter the contents detonated exothermically such that a "ping" was heard. A subsequent infrared spectrum revealed the presence of $COF_2$,

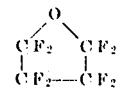

and $C_2F_6$ with octafluorotetrahydrofuran being the major component.

EXAMPLE II

A 150 ml. monel cylinder containing finely ground AgF was flushed with fluorine gas and cooled to $-196°$ C. Perfluoroglutaryl fluoride (0.266 gm./1.08 m. mole) was condensed to the bottom of the reactor after which a quantitative amount of fluorine was condensed into the reactor. The reactor was closed and placed in a $-55°$ C bath which was allowed to warm to room temperature over a period of several hours. After a total reaction period of 20 hours the cylinder was opened and the contents analyzed.

The contents consisted of one major product and two minor products. Analysis of the sample by gas chromatography using a 12 foot perfluorotributylamine column at room temperature indicated the major product to be

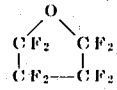

with traces of $COF_2$ and $C_2F_6$. The structure of the major product was confirmed by nuclear magnetic resonance.

EXAMPLE III

A 1 liter stainless steel cylinder was packed with freshly ground CsF. After evacuating the cylinder on a vacuum line, perfluoroglutaryl fluoride was expanded into the cylinder to 52 mm. Hg and condensed at $-196°$ C. An equivalent amount of fluorine was condensed into the cylinder. The reactor was closed and placed into a $-78°$ C bath where it was allowed to warm up slowly to room temperature. Analysis of the contents by gas phase chromatography indicated the major product to be octafluorotetrahydrofuran with traces of carbonyl fluoride and hexafluoroethane.

EXAMPLE IV

Perfluoroglutaryl fluoride (1,143 ml. 0 52 mm. Hg - 3.22 m. mole) was expanded into a 1 liter stainless steel cylinder containing 25 gm. CsF along with 5.5 gm. of stainless steel mesh. Fluorine (143 ml. 0 830 mm. Hg - 6.44 m. mole) was then expanded into the cylinder and condensed. The reaction was carried out for 3 hours. At the end of the reaction period, volatiles were vacuum stripped from the reactor at $-78°$ C. Analysis of the products by infrared spectroscopy indicated that the major product was

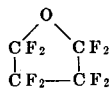

with traces of $COF_2, C_2F_6$ and $C_3F_8$.

EXAMPLE V

Cesium fluoride (40 gm.) and 30 stainless steel balls as heat transferring material were added to a stainless steel U-tube (½inch O.D. × 6 inch high) which had been passivated with fluorine. The U-tube was placed on a vacuum line for evacuation after which 0.5 m. mole of

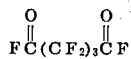

was vacuum transferred into the U-tube at −196° C. The U-tube was warmed to −78° C and fluorine (1 m. mole) was slowly pumped through with the products being collected in a U-trap at −196° C over a period of 1 hour. Analysis of the products indicated a mixture consisting of small amounts of $COF_2$ and $C_2F_6$ along with the major product,

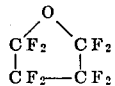

We claim:
1. A process for the preparation of octafluorotetrahydrofuran which comprises reacting perfluoroglutaryl fluoride with fluorine in the presence of KF, CsF, AgF or RbF as catalyst at a temperature within the range of from about −196° to 25° C and recovering the octafluorotetrahydrofuran.
2. The process of claim 1 wherein the reaction temperature is within the range of from −150° to −50° C.
3. The process of claim 1 wherein the catalyst is CsF.
4. The process of claim 1 wherein the catalyst is finely ground and intermixed with a heat transferring material.
5. The process of claim 4 wherein the heat transferring material is stainless steel.
6. The process of claim 1 wherein stoichiometric quantities of perfluoroglutaryl fluoride and fluorine are reacted.

* * * * *